US012725583B2

(12) United States Patent
Hsieh et al.

(10) Patent No.: US 12,725,583 B2
(45) Date of Patent: Sep. 1, 2026

(54) DRIVING CIRCUIT, DRIVING METHOD ADAPTED FOR DRIVING A DATA LINE OF A DISPLAY PANEL AND METHOD OF ESTABLISHING AT LEAST ONE PREDETERMINED TABLE THEREOF

(71) Applicant: NOVATEK MICROELECTRONICS CORP., Hsinchu (TW)

(72) Inventors: Yi-Ting Hsieh, Tainan City (TW); Hsien-Po Huang, Hsinchu City (TW); Yen-Tao Liao, Hsinchu City (TW)

(73) Assignee: Novatek Microelectronics Corp., Hsinchu (TW)

( * ) Notice: Subject to any disclaimer, the term of this patent is extended or adjusted under 35 U.S.C. 154(b) by 170 days.

(21) Appl. No.: 18/644,839

(22) Filed: Apr. 24, 2024

(65) Prior Publication Data

US 2025/0336376 A1 Oct. 30, 2025

(51) Int. Cl.
*G09G 3/36* (2006.01)

(52) U.S. Cl.
CPC ... *G09G 3/3614* (2013.01); *G09G 2320/0233* (2013.01); *G09G 2320/0242* (2013.01); *G09G 2320/0266* (2013.01)

(58) Field of Classification Search
CPC ......... G09G 3/3614; G09G 2320/0233; G09G 2320/0242; G09G 2320/0266; G09G 3/3648
See application file for complete search history.

(56) References Cited

U.S. PATENT DOCUMENTS 8,988,335 B2 * 3/2015 Jung .................... G09G 3/3614 345/98
2012/0169720 A1 * 7/2012 Moh .................... G09G 3/3614 345/419
2013/0187901 A1 7/2013 Chiu et al.
(Continued)

FOREIGN PATENT DOCUMENTS

CN 108847194 A * 11/2018 ........... G09G 3/3696
KR 20080048246 A * 6/2008 ........... G09G 3/3614
TW 202223868 A 6/2022

OTHER PUBLICATIONS

Official Action mailed to Foreign Counterpart Patent Application No. 113123852 on May 5, 2025.

*Primary Examiner* — Amr A Awad
*Assistant Examiner* — Maheen I Javed
(74) *Attorney, Agent, or Firm* — Rosenberg, Klein & Lee

(57) ABSTRACT

A driving circuit and driving method adapted for driving a data line of a display panel are provided. At least one predetermined table is provided by a controller circuit and applied according to a polarity state of a pixel data in related to a polarity state of its previous pixel data. A first or second mapping table is selected when the two polarity states are identical. A third or fourth mapping table is selected when the two polarity states are different. A corresponding pixel voltage based on the selected mapping table is generated for driving the data line, such that polarity transition between two adjacent sub-pixel units using common data line is considered. In addition, a method of establishing the at least one predetermined table is proposed as well. The invention achieves in providing better visual performances and suppressing conventional visual defects on a liquid crystal display panel.

27 Claims, 12 Drawing Sheets

(56) References Cited

U.S. PATENT DOCUMENTS

| | | | | |
|---|---|---|---|---|
| 2017/0053612 | A1* | 2/2017 | Shin | G09G 3/3648 |
| 2021/0118382 | A1* | 4/2021 | Wu | G09G 3/3614 |
| 2021/0225308 | A1* | 7/2021 | Xiong | G09G 3/3614 |

* cited by examiner

MT1 gray level of previous pixel data (+)

gray level of current pixel data(+)

| | 0 | 16 | 32 | 64 | 96 | 128 | 160 | 192 | 256 |
|---|---|---|---|---|---|---|---|---|---|
| 0 | 0 | 0 | 0 | 0 | 0 | 0 | 0 | 0 | 0 |
| 16 | 18 | 16 | 13 | 10 | 8 | 5 | 0 | 0 | 0 |
| 32 | 48 | 35 | 32 | 30 | 25 | 23 | 20 | 18 | 15 |
| 64 | 110 | 100 | 90 | 64 | 58 | 50 | 48 | 40 | 38 |
| 96 | 150 | 130 | 115 | 108 | 96 | 90 | 88 | 85 | 83 |
| 128 | 180 | 170 | 160 | 150 | 140 | 128 | 120 | 116 | 115 |
| 160 | 245 | 240 | 235 | 228 | 190 | 175 | 160 | 155 | 148 |
| 192 | 256 | 256 | 253 | 250 | 245 | 230 | 200 | 192 | 185 |
| 256 | 256 | 256 | 256 | 256 | 256 | 256 | 256 | 256 | 256 |

Fig. 5

MT2 gray level of previous pixel data (-)

gray level of current pixel data(-)

| | 0 | 16 | 32 | 64 | 96 | 128 | 160 | 192 | 256 |
|---|---|---|---|---|---|---|---|---|---|
| 0 | 0 | 0 | 0 | 0 | 0 | 0 | 0 | 0 | 0 |
| 16 | 20 | 16 | 14 | 11 | 8 | 6 | 0 | 0 | 0 |
| 32 | 47 | 36 | 32 | 29 | 25 | 22 | 19 | 15 | 13 |
| 64 | 111 | 102 | 91 | 64 | 59 | 51 | 49 | 41 | 37 |
| 96 | 148 | 130 | 115 | 107 | 96 | 91 | 88 | 85 | 80 |
| 128 | 177 | 170 | 160 | 150 | 140 | 128 | 120 | 118 | 115 |
| 160 | 243 | 240 | 236 | 230 | 190 | 177 | 160 | 155 | 150 |
| 192 | 256 | 256 | 254 | 250 | 245 | 230 | 200 | 192 | 187 |
| 256 | 256 | 256 | 256 | 256 | 256 | 256 | 256 | 256 | 256 |

Fig. 6

MT3 gray level of previous pixel data (+)

gray level of current pixel data(-)

| | 0 | 16 | 32 | 64 | 96 | 128 | 160 | 192 | 256 |
|---|---|---|---|---|---|---|---|---|---|
| 0 | 0 | 0 | 0 | 0 | 0 | 0 | 0 | 0 | 0 |
| 16 | 19 | 25 | 35 | 42 | 60 | 75 | 82 | 90 | 100 |
| 32 | 45 | 50 | 60 | 70 | 80 | 90 | 95 | 100 | 105 |
| 64 | 111 | 120 | 128 | 132 | 138 | 142 | 150 | 160 | 165 |
| 96 | 145 | 150 | 158 | 165 | 170 | 180 | 190 | 200 | 210 |
| 128 | 175 | 185 | 190 | 200 | 210 | 230 | 230 | 240 | 250 |
| 160 | 243 | 250 | 255 | 256 | 256 | 256 | 256 | 256 | 256 |
| 192 | 256 | 256 | 256 | 256 | 256 | 256 | 256 | 256 | 256 |
| 256 | 256 | 256 | 256 | 256 | 256 | 256 | 256 | 256 | 256 |

Fig. 7

MT4 gray level of previous pixel data (-)

gray level of current pixel data(+)

| | 0 | 16 | 32 | 64 | 96 | 128 | 160 | 192 | 256 |
|---|---|---|---|---|---|---|---|---|---|
| 0 | 0 | 0 | 0 | 0 | 0 | 0 | 0 | 0 | 0 |
| 16 | 20 | 27 | 39 | 50 | 62 | 77 | 83 | 89 | 101 |
| 32 | 44 | 52 | 61 | 71 | 82 | 91 | 96 | 99 | 103 |
| 64 | 112 | 121 | 130 | 134 | 140 | 145 | 152 | 161 | 166 |
| 96 | 147 | 121 | 157 | 166 | 169 | 180 | 190 | 200 | 212 |
| 128 | 173 | 184 | 194 | 205 | 212 | 221 | 229 | 238 | 249 |
| 160 | 240 | 249 | 255 | 256 | 256 | 256 | 256 | 256 | 256 |
| 192 | 256 | 256 | 256 | 256 | 256 | 256 | 256 | 256 | 256 |
| 256 | 256 | 256 | 256 | 256 | 256 | 256 | 256 | 256 | 256 |

Fig. 8

DRIVING CIRCUIT, DRIVING METHOD ADAPTED FOR DRIVING A DATA LINE OF A DISPLAY PANEL AND METHOD OF ESTABLISHING AT LEAST ONE PREDETERMINED TABLE THEREOF

BACKGROUND OF THE INVENTION

Field of the Invention

The present invention is related to a driving technology for driving a data line of a display panel. More particularly, the present invention is aimed to provide a driving circuit and its driving method thereof which are applicable to driving a data line of a liquid crystal display panel. Moreover, a method of establishing at least one predetermined table for the driving circuit adapted for driving a data line of a liquid crystal display panel is provided as well.

Description of the Related Arts

As known, in Liquid Crystal Display (LCD) devices, it has been significantly proposed to improve its related manufacturing technologies, low power consumption, more efficient drivability of its driving means, high display quality as well as a large screen panel thereof. And therefore, it is believed that in the current technologies, the LCD devices are being popularized, and application fields for these LCD devices are continuously expanding.

FIG. 1 schematically shows a typical liquid crystal display panel of a LCD device in the related arts. As can be seen, a plurality of source driving lines, also known as data lines S1, S2 . . . Sn are employed to write data into each sub-pixel 10 of the liquid crystal display panel 900. On the other side, a plurality of gate driving lines, including G1, G2, G3, G4, G5, also known as row lines, are employed to provide gate driving voltages to each gate terminal of the sub-pixel 10 in order to turn on the corresponding sub-pixel 10 of the liquid crystal display panel 900. In general, the gate driving lines G1, G2, G3, G4, G5 connects all the gate terminals of the sub-pixels 10 on the same row, while the source driving lines S1, S2 . . . Sn connects all the source terminals of the sub-pixels 10 on the same column line. By such configurations, when each gate driving lines G1, G2, G3, G4, G5 provides the gate driving voltage so that a corresponding sub-pixel 10 is turned on, the data of the source driving lines S1, S2 . . . Sn will be written into a liquid crystal capacitor of the sub-pixel 10 and signals the capacitor (in the form of voltage) so as to control the deflection angle of the liquid crystal molecule to realize the display of the liquid crystal display panel 900. For instance, a first row of the sub-pixels 10 are activated to show a gray level of 200 and a polarity of positive (+) in red color. As can be seen in the drawing in FIG. 1, it is indicated by "R 200 (+)". By applying the same manners, a second row of the sub-pixels 10 are activated to show a gray level of 128 and having a polarity of positive (+) in green color. As can be seen in the drawing in FIG. 1, it is indicated by "G 128 (+)". A third row of the sub-pixels 10 are activated to show a gray level of 128 and on the contrary, having a polarity of negative (−) in blue color. As can be seen in the drawing in FIG. 1, it is indicated by "B 128 (−)". A fourth row of the sub-pixels 10 are activated to show a gray level of 200 and having a polarity of negative (−) in red color. As can be seen in the drawing in FIG. 1, it is indicated by "R 200 (−)". And a fifth row of the sub-pixels 10 are activated to show a gray level of 225 and having a polarity of positive (+) in green color. As can be seen in the drawing in FIG. 1, it is indicated by "G 225(+)".

Please refer to FIG. 2, which shows a demonstrative waveform of the driving voltage in related to the source driving line Sn in FIG. 1 for sequentially showing the imaging of R 200(+), G 128(+), B 128(−), R 200(−), and G 225(+) on the liquid crystal display panel 900. What draws our attention is that, in FIG. 2, a thicker line labelled as L1, is used to indicate an ideal driving voltage of the source driving line Sn, which is to be expected. And nevertheless, an actual waveform, as indicated by a thinner line which is labelled as L2, is always observed. And a plurality of time delays D1, D2, D3 and D4 are inevitably generated. For people who have ordinary skilled backgrounds in the arts have acknowledged, these time delays D1, D2, D3, D4 are undesirable, and several methods have been discussed in the existing technologies for solving these issues.

For instance, FIG. 3 shows a common processing flow chart in the related arts as a conventional solution. As can be seen in FIG. 3, the Gamma correction has been usually applied. As indicated in the flow chart in FIG. 3, the Gamma correction (+) is applied to the condition that the polarity of the row sub-pixel is positive, for example, the R 200 (+), G 128 (+), G 225 (+). And yet, the Gamma correction (−) is only applied to the row sub-pixels having a negative polarity, for example, B 128 (−) and R 200 (−). As known in the related arts, these delays D1, D2, D3 and D4 are mainly contributed on account of the polarity inversion between each adjacent row sub-pixels. For instance, the time delay D1 is resulted from switching the positive gray level of R 200 (+) to the positive gray level of G 128 (+). The time delay D2 is resulted from switching the positive gray level of G 128 (+) to the negative gray level of B 128 (−). The time delay D3 is resulted from switching the negative gray level of B 128 (−) to the negative gray level of R 200 (−). And the time delay D4 is resulted from switching the negative gray level of R 200 (−) to the positive gray level of G 225 (+). However, even by adopting the current existing method including taking the Gamma corrections into considerations, apparently, challenges remain and those undesired time delays D1, D2, D3, D4 are still unsolved. The delay and variation of the driving voltages of a liquid crystal display panel of a LCD device in the related arts apparently fails to satisfy the in-time requirement, which leads to significant synchronization data errors in the related arts. As such, it is believed that further improvements and alternative methodologies in the field are still to be expected. And as a result, it, in view of all, should be apparent and obvious that there is indeed an urgent need for the professionals in the field for a novel and inventive driving circuit which is adapted for driving a data line of a display panel as well as a method for driving the data line, which are to be developed, so as to solve the above-mentioned issues, and to provide a modified and better correction principle ever while compared to the prior arts.

SUMMARY OF THE INVENTION

In order to overcome the above-mentioned disadvantages, one major objective in accordance with the present invention is to provide a novel driving circuit and a driving method thereof in order to effectively drive a data line of a display panel in a modified and improved technology.

By employing the proposed technical contents, conventional visual defects, such as color shift and vertical stripes which may occur in the prior arts of a typical liquid crystal display panel can be effectively suppressed and avoided. Therefore, the present invention is believed to be able to achieve in providing a superior visual performance for a liquid crystal display panel device.

The disclosed driving circuit and driving method adapted for driving the data line of the display panel, for example, can be applied to a display panel composed of liquid crystal displays. However, the present invention is certainly not limited thereto. The proposed driving circuit and driving method adapted for driving the data line as provided in the present invention may also be applied to other applicable configurations of various display devices. Many alternatives and modifications will be apparent to those skilled in the art, once informed by the present disclosure.

According to one embodiment of the present invention, a driving circuit adapted for driving a data line of a display panel is provided first. The proposed driving circuit includes a controller circuit and an outputting circuit. The controller circuit is configured to provide at least one predetermined table and generate at least one pixel data according to the at least one predetermined table. The at least one predetermined table is selected and applied according to a polarity state of a pixel data in related to a polarity state of a previous pixel data which is provided prior to the pixel data. The outputting circuit is configured as being electrically connected to the controller circuit and coupled to the data line for driving the data line of the display panel with at least one pixel voltage associated with the at least one pixel data.

According to the embodiment of the present invention, a first predetermined table from the at least one predetermined table is selected and applied to generate a first pixel data associated with a first pixel voltage to drive the data line of the display panel when a polarity state of the first pixel data and a polarity state of a previous pixel data which is provided prior to the first pixel data are identical. On the other hand, a second predetermined table from the at least one predetermined table is selected and applied to generate a second pixel data associated with a second pixel voltage to drive the data line of the display panel when a polarity state of the second pixel data and a polarity state of a previous pixel data which is provided prior to the second pixel data are different.

According to the embodiment of the present invention when a polarity state of the first pixel data and a polarity state of the previous pixel data which is provided prior to the first pixel data are identical, the first predetermined table includes a first mapping table, where the first mapping table is applied when the polarity state of the previous pixel data which is provided prior to the first pixel data is positive, and the polarity state of the first pixel data remains at a positive polarity.

In addition, according to the embodiment of the present invention when the polarity state of the first pixel data and the polarity state of the previous pixel data which is provided prior to the first pixel data are identical, the first predetermined table may also include a second mapping table. And the second mapping table is applied when the polarity state of the previous pixel data which is provided prior to the first pixel data is negative, and the polarity state of the first pixel data remains at a negative polarity. According to the embodiment of the present invention, the first mapping table includes a plurality of entries, and each of the plurality of entries of the first mapping table corresponds to an entry of the second mapping table, and at least one of the plurality of entries of the first mapping table is different from the corresponding entry of the second mapping table.

On the other hand, according to another embodiment of the present invention when a polarity state of the second pixel data and a polarity state of a previous pixel data which is provided prior to the second pixel data are different, the second predetermined table includes a third mapping table, where the third mapping table is applied when the polarity state of the previous pixel data which is provided prior to the second pixel data is positive, and the polarity state of the second pixel data is switched to have a negative polarity. In addition, according to the embodiment of the present invention when the polarity state of the second pixel data and the polarity state of the previous pixel data which is provided prior to the second pixel data are different, the second predetermined table may further include a fourth mapping table, where the fourth mapping table is applied when the polarity state of the previous pixel data which is provided prior to the second pixel data is negative, and the polarity state of the second pixel data is switched to have a positive polarity. According to the embodiment of the present invention, the third mapping table includes a plurality of entries, and each of the plurality of entries of the third mapping table corresponds to an entry of the fourth mapping table, and at least one of the plurality of entries of the third mapping table is different from the corresponding entry of the fourth mapping table.

In addition, the present invention is aimed to provide a method for driving a data line of a display panel as well. According to the present invention, the disclosed method includes a plurality of following steps.

(a) at least one predetermined table is provided by a controller circuit, wherein the at least one predetermined table is selected and applied according to a polarity state of a pixel data in related to a polarity state of a previous pixel data which is provided prior to the pixel data;

(b) the polarity state of the pixel data and the polarity state of the previous pixel data which is provided prior to the pixel data is examined, so as to select a first predetermined table or a second predetermined table from the at least one predetermined table;

(c) the first predetermined table is applied to generate a first pixel data associated with a first pixel voltage to drive the data line of the display panel, or the second predetermined table is applied to generate a second pixel data associated with a second pixel voltage to drive the data line of the display panel, wherein the first predetermined table is applied when a polarity state of the first pixel data and a polarity state of a previous pixel data which is provided prior to the first pixel data are identical, and the second predetermined table is applied when a polarity state of the second pixel data and a polarity state of a previous pixel data which is provided prior to the second pixel data are different; and (d) the first pixel voltage or the second pixel voltage is received by a driving circuit when either the first predetermined table or the second predetermined table is selected and being applied, so as to drive the data line of the display panel with the first pixel voltage or the second pixel voltage.

According to the embodiment of the present invention, the first pixel data is outputted immediately following the previous pixel data which is provided prior to the first pixel data to drive the data line. And the first pixel data and the previous pixel data provided prior to the first pixel data are respectively outputted to drive each of two adjacent sub-pixel units of the display panel, and the two adjacent sub-pixel units are configured using a common data line on the display panel. The second pixel data is outputted immediately following the previous pixel data which is provided prior to the second pixel data to drive the data line. And the second pixel data and the previous pixel data which is provided prior to the second pixel data are respectively outputted to drive each of two adjacent sub-pixel units of the display panel, and the two adjacent sub-pixel units are configured using a common data line on the display panel.

According to the embodiment of the present invention, the first predetermined table in related to the identical polarity state of the first pixel data and the previous pixel data which is provided prior to the first pixel data includes a first mapping table and a second mapping table as disclosed above. The second predetermined table in related to the different polarity state of the second pixel data and the previous pixel data which is provided prior to the second pixel data includes a third mapping table and a fourth mapping table as disclosed above. Please refer to the earlier disclosure and the Applicants of the present invention omit the similar descriptions thereto.

And yet, in still another aspect, the present invention is also aimed to provide a method of establishing at least one predetermined table for a driving circuit adapted for driving a data line of a display panel as well. According to the present invention, the display panel includes a plurality of sub-pixel units, each of the plurality of sub-pixel units is driven by a pixel voltage associated with a pixel data to show brightness, and the disclosed establishing method includes a plurality of following steps.

(a) a polarity state of the pixel data and a polarity state of a previous pixel data which is provided prior to the pixel data is examined so as to determine one of the at least one predetermined table for establishing;

(b) a given value of the pixel data is provided for showing a reference brightness and the reference brightness is sensed by an optical sensor;

(c) the reference brightness is compared to an ideal brightness which is expected to be shown, and the given value is adjusted to a final value until a final brightness corresponding to the final value is identical to the ideal brightness;

(d) the final value of the pixel data is recorded as one entry of the predetermined table for establishing; and (e) collecting a plurality of the entries so as to form the predetermined table for establishing.

In practical, according to the embodiment of the present invention, the given value of the pixel data can be recorded as one entry of the predetermined table for establishing when the reference brightness is identical to the ideal brightness.

Moreover, before completely forming the predetermined table for establishing, the disclosed method further includes examining if all entries of the predetermined table for establishing are recorded and collected; and repeatedly providing the given value and adjusting the given value to the final value for collecting all entries so as to form the predetermined table.

To sum above, it is believed that the disclosed driving circuit and driving method according to the invention can be applied to drive a data line of a display panel, which is a liquid crystal display panel, for instance. By adopting the proposed technical contents of the invention, the prior drawbacks and deficiencies in the related arts are believed to be eliminated in the present invention. Thereby, it is believed that the present invention successfully solves the problems of prior arts and performs as being highly competitive and able to be widely utilized in any related display panel industries.

As a result, it has been proved and verified that the present invention is sophisticatedly designed, and the whole new driving techniques can be employed in a display driver circuit architecture and has succeeded in providing better performances and efficiency. Meanwhile, a superior visual effect of a liquid crystal panel device can be modified and improved by adopting the present invention while compared to the prior arts.

These and other objectives of the present invention will become obvious to those of ordinary skill in the art after reading the following detailed description of preferred embodiments.

It is to be understood that both the foregoing general description and the following detailed description are exemplary and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings:

FIG. 5 schematically shows a representative figure indicating the first mapping table in accordance with the embodiment of the present invention.

FIG. 6 schematically shows a representative figure indicating the second mapping table in accordance with the embodiment of the present invention.

FIG. 7 schematically shows a representative figure indicating the third mapping table in accordance with the embodiment of the present invention.

FIG. 8 schematically shows a representative figure indicating the fourth mapping table in accordance with the embodiment of the present invention.

DESCRIPTION OF THE PREFERRED EMBODIMENTS

Figure 1:
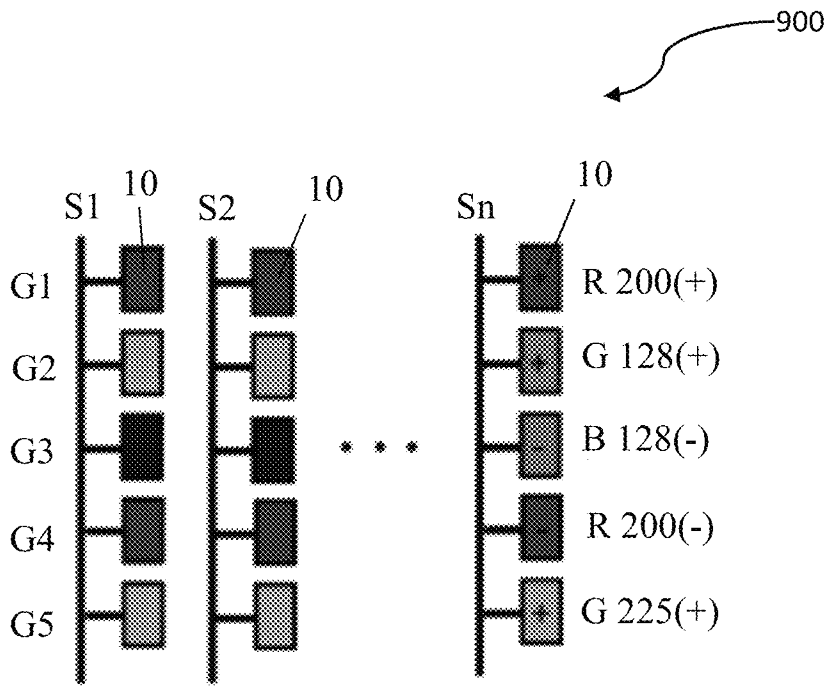
Fig. 1 (related art)
FIG. 1 schematically shows a typical liquid crystal display panel of a LCD device in the related arts illustrating a plurality of sub-pixels each driven by a gate driving line and a corresponding data line.
Figure 2:
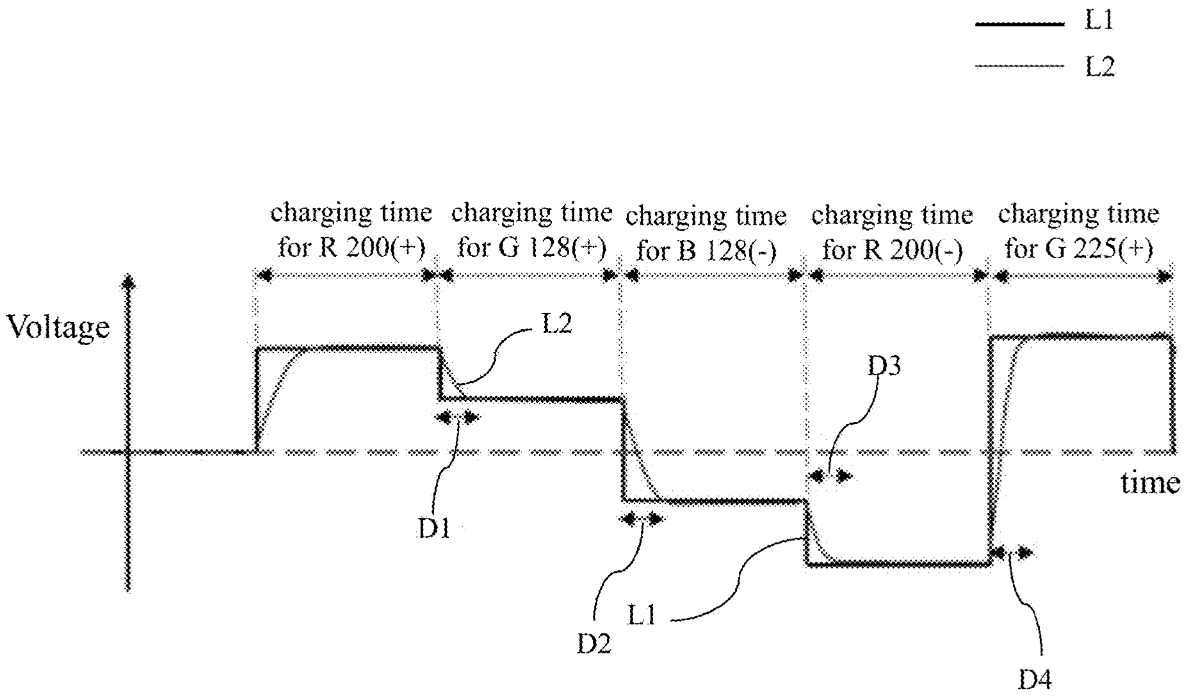
Fig. 2 (related art)
FIG. 2 schematically shows a demonstrative waveform of the driving voltage in related to the source driving line Sn in FIG. 1 for sequentially showing the imaging of R 200 (+), G 128 (+), B 128 (−), R 200 (−), and G 225 (+) on the liquid crystal display panel while compared the actual waveform with an ideal driving voltage.
Figure 3:
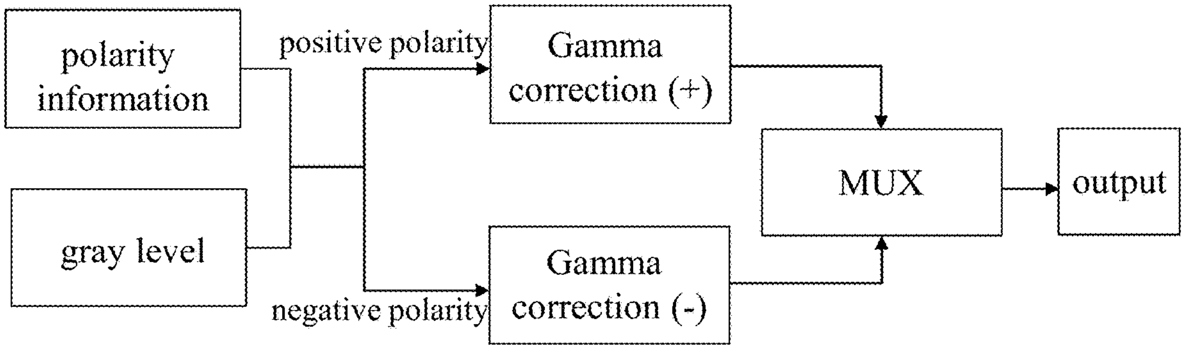
Fig. 3 (related art)
FIG. 3 schematically shows a diagram illustrating a common processing flow chart for providing as a conventional solution using the Gamma corrections in the backgrounds of the related arts.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Unless otherwise specified, some conditional sentences or words, such as "can", "could", "might", or "may", usually attempt to express that the embodiment in the invention has, but it can also be interpreted as a feature, element, or step that may not be needed. In other embodiments, these features, elements, or steps may not be required.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled to," "couples to," and "coupling to" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the article "a" and "the" includes the meaning of "one or at least one" of the element or component. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. Every example in the present specification cannot limit the claimed scope of the invention.

In the following descriptions, the present invention is aimed to provide a driving circuit which is adapted for driving a data line of a display panel. In addition, a method for driving the data line of a display panel will be discussed and proposed at the same time. The proposed driving circuit and method for driving the data line achieve to drive a liquid crystal display panel in a line overdrive manner. Especially, while compared with the related arts in the technical backgrounds, the present invention is sophisticatedly modified and succeeds in taking the polarity inversion criterion of the pixel data of two adjacent sub-pixel units using a common data line of the display panel into considerations. As a result, by employing the technical solution proposed by the present invention, a plurality of conventional visual defects, such as color shift and vertical stripes which may occur in the prior arts of a typical liquid crystal display panel can be effectively suppressed and avoided. Alternatively, the disclosed technologies regarding the driving circuit and driving method adapted for driving a data line of a display panel, as provided below in the present invention may also be applied to other display panels. The present invention is not limited thereto the following descriptions.

Figure 4:
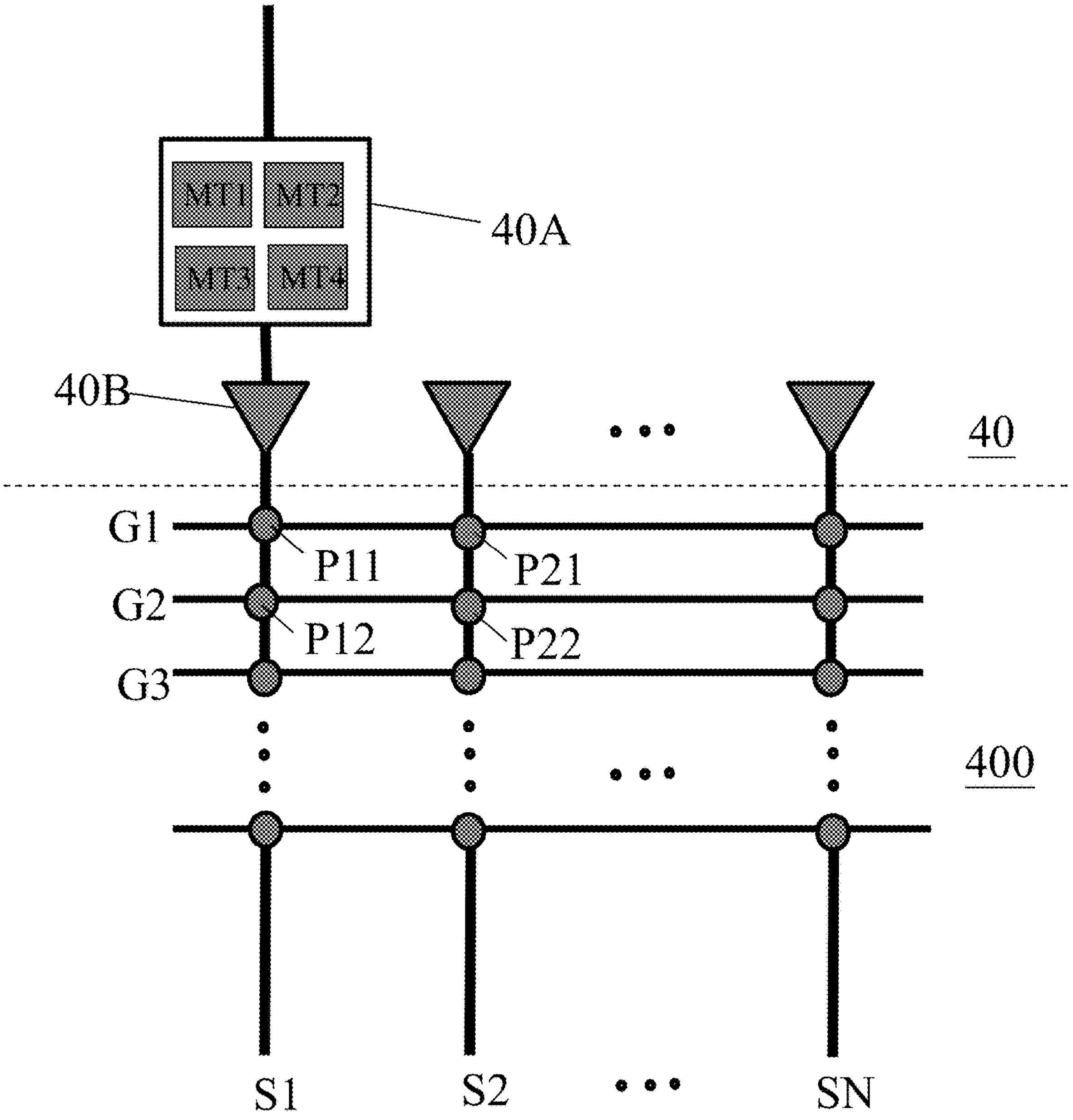
FIG. 4 schematically shows a generic circuit diagram exemplarily illustrating a driving circuit adapted for driving a data line of a display panel in accordance with an embodiment of the present invention.

At first, please refer to FIG. 4, which shows a schematic circuit diagram exemplarily illustrating a driving circuit adapted for driving a data line of a display panel in accordance with an embodiment of the present invention. As can be seen in FIG. 4, the driving circuit 40 is adapted and applicable to drive a display panel 400. According to the embodiment of the present invention, the display panel 400, for instance, can be a liquid crystal display (LCD) panel comprising a plurality of sub-pixel units for imaging. As illustrated in FIG. 4, the plurality of sub-pixel units are configured in a pixel array, and each sub-pixel unit is electrically connected with a data line and a gate line so as to be driven by a pixel voltage provided by the driving circuit. For providing better understandings, in the schematic circuit diagram scheme as FIG. 4 represents, the sub-pixel unit which is electrically coupled with a data line S1 and a gate line G1 and driven by the data line S1 and the gate line G1 will be illustrated as a sub-pixel unit P11. The sub-pixel unit which is electrically coupled with a data line S1 and another gate line G2 and driven by the data line S1 and the gate line G2 will be illustrated as a sub-pixel unit P12. By applying the same manners, the sub-pixel unit which is electrically coupled with a data line S2 and a gate line G1 and driven by the data line S2 and the gate line G1 will be illustrated as a sub-pixel unit P21. And the sub-pixel unit which is electrically coupled with a data line S2 and a gate line G2 and driven by the data line S2 and the gate line G2 will be illustrated as a sub-pixel unit P22. According to the embodiment of the present invention, the sub-pixel unit P11 and the sub-pixel unit P12 are two adjacent sub-pixel units which are configured using a common data line S1 of the display panel 400. And, the sub-pixel unit P21 and the sub-pixel unit P22 are two adjacent sub-pixel units which are configured using a common data line S2 of the display panel 400.

As referring to FIG. 4, the driving circuit 40 adapted for driving a data line S1, S2 . . . SN of the display panel 400 includes a controller circuit 40A and an outputting circuit 40B which is electrically connected with the controller circuit 40A and coupled to the data line S1, S2 . . . SN for driving the data line S1, S2 . . . SN of the display panel 400. Hereinafter, in the following descriptions, the present invention uses the data line S1 as a demonstrative embodiment for introducing the technical characteristics of the present invention. However, the present invention is certainly not limited thereto. According to the present invention, the driving circuit and driving method applicable for driving the data line S1 may also be applied to drive the data line S2 . . . SN. Since the technical solution to drive each of the data lines S1, S2 . . . SN is the same, the Applicants of the present invention discuss the data line S1 as an example and omit the similar descriptions regarding the other data lines S2 . . . SN.

According to the embodiment of the present invention, the outputting circuit 40B, for instance, can be a source operational amplifier (source op-amp), which is coupled to the data line S1 for driving the data line S1 with a pixel voltage associated with a pixel data provided by the controller circuit 40A. The controller circuit 40A of the driving circuit 40 is configured to provide at least one predetermined table and generate at least one pixel data according to predetermined table. As can be seen, in FIG. 4, the predetermined tables according to the present invention, for instance, may include a first mapping table MT1, a second mapping table MT2, a third mapping table MT3 and a fourth mapping table MT4. Among these predetermined tables MT1, MT2, MT3, MT4, one mapping table out of the predetermined tables MT1, MT2, MT3, MT4 will be selected and applied for driving the data line S1. The selecting principle is mainly based on and according to a polarity state of a pixel data in related to a polarity state of a previous pixel data which is provided prior to the pixel data.

For detailed descriptions, please refer to FIG. 5, FIG. 6, FIG. 7 and FIG. 8 which individually shows a representative figure indicating the first mapping table MT1, the second mapping table MT2, the third mapping table MT3 and the fourth mapping table MT4 in accordance with the embodiment of the present invention. As can be seen in FIG. 5, when a polarity state of a previous pixel data which is provided prior to a current pixel data is positive (+), and the polarity state of the current pixel data remains at a positive polarity (+), indicating that there is no polarity transition between each two adjacent pixel data, at this time, the first mapping table MT1 will be selected and applied to generate the current pixel data, such that an associated pixel voltage according to the current pixel data will be provided to the source operational amplifier of the driving circuit 40 so as to drive the data line S1 of the display panel 400. On the contrary, FIG. 6 shows the second mapping table MT2, indicating that when a polarity state of a previous pixel data which is provided prior to a current pixel data is negative (−), and the polarity state of the current pixel data remains at a negative polarity (−), at this time, the second mapping table MT2 will be selected and applied. Under such a condition, there is also no polarity transition between each two adjacent pixel data. When the second mapping table MT2 is selected and applied to generate the current pixel data, another associated pixel voltage according to the current pixel data will be provided to the source operational amplifier of the driving circuit 40 so as to drive the data line S1 of the display panel 400. For instance, when a gray level of a previous pixel data is +16 (having the positive polarity) shown by the sub-pixel unit P11 (see FIG. 4), and a gray level of a current pixel data which is expected to be shown by the sub-pixel unit P12 in FIG. 4, is +64 (still having the positive polarity), then the first mapping table MT1 in FIG. 5 needs to be selected and applied. At this time, a pixel voltage associated with the mapping pixel data "100" (having the positive polarity) will be referred and provided to the driving circuit 40 so as to drive the data line S1 of the display panel 400.

On the contrary, when a gray level of a previous pixel data is −16 (having the negative polarity), and a gray level of a current pixel data which is expected to be shown is −64 (still having the negative polarity), then the second mapping table MT2 in FIG. 6 will be selected and applied, instead. Under such a circumstance, a pixel voltage associated with the mapping pixel data "102" (having the negative polarity) will be referred and provided to the driving circuit 40 so as to drive the data line S1 of the display panel 400.

It should be noted that, the discussed previous pixel data and current pixel data to be shown are meant to be configured on a same data line, using the same data line and driven by the same data line, for example, the data line S1. And, the previous pixel data is provided prior to the current pixel data to be shown. In other words, the discussed current pixel data to be shown will be outputted immediately following the previous pixel data to drive a same data line (i.e. the data line S1).

Furthermore, in another aspect, FIG. 7 and FIG. 8 show another two various mapping tables when polarity transition occurs between each two adjacent pixel data configured on a same data line. Among these two various mapping tables, FIG. 7 shows the third mapping table MT3, representing that when a polarity state of a previous pixel data which is provided prior to a current pixel data is positive (+), and yet the polarity state of the current pixel data to be shown is switched to have a negative polarity (−). And it is believed that, at this time, the third mapping table MT3 needs to be selected and applied. Under such a condition, it is obvious that polarity transition between each two adjacent pixel data on a same data line takes place. By adopting the third mapping table MT3 such that the third mapping table MT3 is selected and applied to generate the current pixel data, an associated pixel voltage according to the current pixel data (showing the negative polarity (−)) will be provided to the source operational amplifier of the driving circuit 40 so as to drive the data line S1 of the display panel 400. For instance, when a gray level of a previous pixel data is +16 (having the positive polarity), and a gray level of a current pixel data which is expected to be shown is −64 (having the negative polarity), then as referring to the third mapping table MT3 in FIG. 7, at this time, a pixel voltage associated with the mapping pixel data “120” (having the negative polarity) will be referred and provided to the driving circuit 40 so as to drive the data line S1 of the display panel 400.

And in addition, FIG. 8 furthermore, shows the fourth mapping table MT4, representing that when a polarity state of a previous pixel data which is provided prior to a current pixel data is negative (−), and yet the polarity state of the current pixel data to be shown is switched to have a positive polarity (+). And as a result, at this time, it will be the fourth mapping table MT4 which needs to be selected and applied. Under such a condition, it is obvious that polarity transition between each two adjacent pixel data on a same data line also occurs. As a result, in view of adopting the fourth mapping table MT4 such that the fourth mapping table MT4 is selected and applied to generate the current pixel data, another various associated pixel voltage according to the current pixel data (showing the positive polarity (+)) will be provided to the source operational amplifier of the driving circuit 40 so as to drive the data line S1 of the display panel 400. For instance, when a gray level of a previous pixel data is −16 (having the negative polarity), and a gray level of a current pixel data which is expected to be shown is +64 (having the positive polarity), then as referring to the fourth mapping table MT4 in FIG. 8, under such a circumstance, a various pixel voltage associated with the mapping pixel data “121” (having the positive polarity) needs to be referred instead, and be provided to the driving circuit 40 so as to drive the data line S1 of the display panel 400.

As we can see from these mapping tables, including the first mapping table MT1 in FIG. 5, the second mapping table MT2 in FIG. 6, the third mapping table MT3 in FIG. 7 and the fourth mapping table MT4 in FIG. 8, it is apparent that the first mapping table MT1 includes a plurality of entries, the second mapping table MT2 includes a plurality of entries, the third mapping table MT3 includes a plurality of entries, and the fourth mapping table MT4 includes a plurality of entries. Each entry of the mapping tables is corresponding to an entry of another mapping table. For instance, an entry of the first mapping table MT1 in FIG. 5 indicating that an output pixel data when a gray level of a previous pixel data having a positive polarity of +16 is switched to a gray level of a current pixel data having a positive polarity of +64, is “100”. An entry of the second mapping table MT2 in FIG. 6 indicating that an output pixel data when a gray level of a previous pixel data having a negative polarity of −16 is switched to a gray level of a current pixel data having a negative polarity of −64, is “102”. An entry of the third mapping table MT3 in FIG. 7 indicating that an output pixel data when a gray level of a previous pixel data having a positive polarity of +16 is switched to a gray level of a current pixel data having a negative polarity of −64, is “120”. And an entry of the fourth mapping table MT4 in FIG. 8 indicating that an output pixel data when a gray level of a previous pixel data having a negative polarity of −16 is switched to a gray level of a current pixel data having a positive polarity of +64, is “121”. According to the disclosed embodiment of the present invention, at least one entry of the mapping tables MT1, MT2, MT3 and MT4 will be different.

Figure 9:
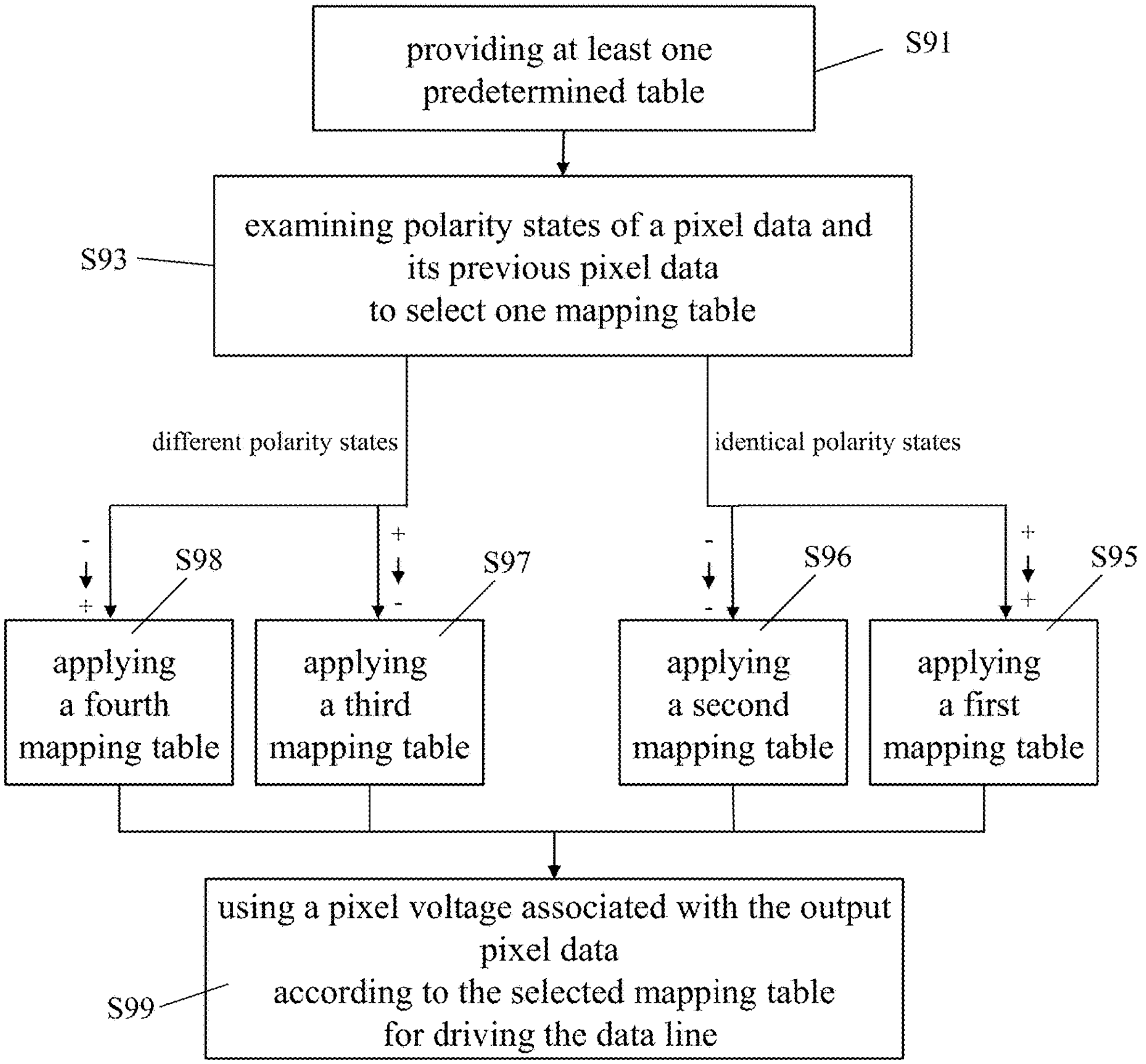
FIG. 9 schematically shows a flow chart illustrating a method for driving a data line of a display panel according to the embodiment as applied to the circuit diagram of FIG. 4 in accordance with the embodiment of the present invention.

In addition, please refer to FIG. 9, which shows a flow chart illustrating a method for driving a data line of a display panel according to the embodiment as applied to the circuit diagram in FIG. 4. Please refer to FIG. 4 along with FIG. 9 at the same time for a better comprehension regarding the driving method of the data line S1 of the display panel 400. The driving circuit 40 adapted for and applicable to driving the data line S1 of the display panel 400 has been introduced as described in the earlier paragraphs. And the method for driving the data line S1 of the display panel 400 will be provided as follows.

According to the embodiment of the present invention, the driving method of the present invention includes a plurality of steps S91, S93, S95, S96, S97, S98 and S99. At first, in the step of S91, at least one predetermined table is provided by a controller circuit. For instance, in one embodiment, the controller circuit 40A in FIG. 4 is employed to provide the above-mentioned predetermined tables, including the first mapping table MT1, the second mapping table MT2, the third mapping table MT3 and the fourth mapping table MT4. As described earlier in the previous descriptions, each of the mapping tables MT1, MT2, MT3, MT4 will be selected and applied according to a polarity state of a pixel data in related to a polarity state of a previous pixel data which is provided prior to the pixel data.

And subsequently, as illustrated in the step of S93, the disclosed method proceeds to examine the polarity state of the pixel data and the polarity state of the previous pixel data which is provided prior to the pixel data, in order to select one mapping table from the predetermined tables MT1, MT2, MT3, MT4 for being applied and referred to.

For example, when a polarity state of the pixel data and a polarity state of a previous pixel data which is provided prior to the pixel data are identical, the steps of S95 and S96 can be selectively performed.

On the contrary, while a polarity state of the pixel data and a polarity state of a previous pixel data which is provided prior to the pixel data are different, indicating that there is polarity transition occurred between two adjacent pixel data on a same data line, then the steps of S97 and S98 will be selectively performed, instead.

In details, in one embodiment, when the polarity state of the previous pixel data which is provided prior to the pixel data is positive, and the polarity state of the pixel data remains at a positive polarity, as referring in “+→+” in FIG. 9, then the step of S95 is performed, such that the first mapping table MT1 is selected and applied to generate the pixel data which is expected to be shown.

According to another embodiment, when the polarity state of the previous pixel data which is provided prior to the pixel data is negative, and the polarity state of the pixel data remains at a negative polarity, as referring in “−→−” in FIG. 9, then the step of S96 will be performed, such that the second mapping table MT2 is selected and applied to generate the pixel data which is expected to be shown.

On the other hand, regarding the situation that polarity transition is generated between two adjacent pixel data configured on a same data line, for instance, when the polarity state of the previous pixel data which is provided prior to the pixel data is positive, and yet the polarity state of the pixel data is switched to have a negative polarity, as referring in “+→−” in FIG. 9, then the step of S97 will be performed, such that the third mapping table MT3 will be selected and applied to generate the pixel data which is expected to be shown.

And finally, while the polarity state of the previous pixel data which is provided prior to the pixel data is negative, and nevertheless, the polarity state of the pixel data is switched to have a positive polarity, as referring in "−→+" in FIG. 9, then the step of S98 will be performed, such that the fourth mapping table MT4 will be selected and applied to generate the pixel data which is expected to be shown.

As a result, after either the first mapping table MT1, the second mapping table MT2, the third mapping table MT3, or the fourth mapping table MT4 is selected and applied to generate a specific pixel data, a pixel voltage which is associated with the output pixel data is received and provided by the driving circuit so as to drive the data line of the display panel as illustrated in the step of S99.

And furthermore, in the following sections, the present invention in another aspect, further proposes a method of establishing the predetermined table for a driving circuit adapted for driving the data line of a display panel. For the establishing method of a predetermined table, please refer to FIG. 10, which shows a flow chart, comprising a plurality of steps of S111, S113, S115, S117, S119, S121, S123 and S125 for forming the method of establishing a predetermined table for the driving circuit to drive a data line of the display panel according to the embodiment of the present invention. At first, as we have discussed in the previous paragraphs, since there are a plurality of mapping tables which can be provided and referred to by the driving circuit, it is necessary to decide which mapping table the proposed method is going to establish. As a result, as can be seen in the step of S111, a polarity state of the pixel data and a polarity state of a previous pixel data which is provided prior to the pixel data needs to be examined first, so as to determine one predetermined table which is going to be established. For instance, as discussed earlier in the previous paragraphs, if the polarity state of the previous pixel data which is provided prior to the pixel data is positive, and the polarity state of the pixel data remains at a positive polarity, then it is the first mapping table to be established.

On the other hand, if the polarity state of the previous pixel data which is provided prior to the pixel data is negative, and the polarity state of the pixel data remains at a negative polarity, then it will be the second mapping table to be established.

And on the contrary, when there is a polarity transition which occurs between each two adjacent pixel data on a same data line, for instance, the polarity state of the previous pixel data which is provided prior to the pixel data is positive, and the polarity state of the pixel data is switched to have a negative polarity, then it is the third mapping table to be established. And nevertheless, when the polarity state of the previous pixel data which is provided prior to the pixel data is negative, and the polarity state of the pixel data is switched to have a positive polarity, then it will be the fourth mapping table to be established.

Figure 10:
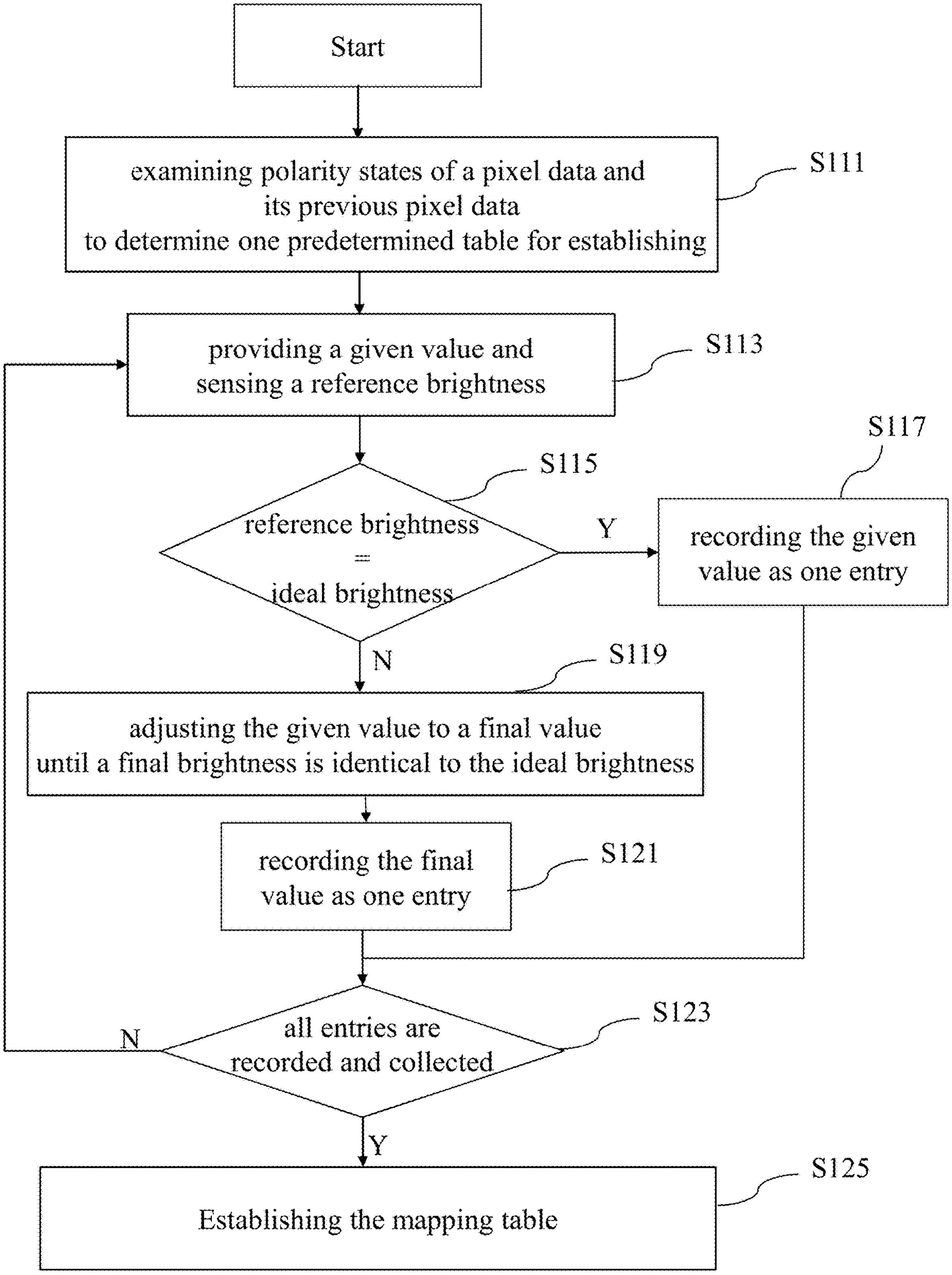
FIG. 10 schematically shows a flow chart illustrating a plurality of steps for forming a disclosed method of establishing a predetermined table for the driving circuit to drive a data line of the display panel according to the embodiment of the present invention.

In other words, according to the flow chart proposed in FIG. 10 of the present invention, by adopting the technical solution, the proposed method can be effectively adapted and applicable to establish either the first mapping table, the second mapping table, the third mapping or the fourth mapping table for the driving circuit to refer to.

And as such, after the mapping table to be established is determined in the step of S111, a given value of the pixel data will be provided in the step of S113, for showing a reference brightness and the reference brightness will be sensed by an optical sensor. In one feasible embodiment of the present invention, an electron microscope or an optical sensing device can be employed to sense and measure the brightness information according to the given value of the pixel data in the step of S113.

After that, as indicated in the step of S115, the brightness information of the reference brightness will be compared to an ideal brightness. The ideal brightness is a theoretical and ideal value which is expected to be shown by the sub-pixel unit of the liquid crystal display panel. Since the reference brightness is generated corresponding to the given value of the pixel data, it is not easy to fit the reference brightness exactly the same as the ideal brightness at the first time. Assume that an optimum solution takes place when the reference brightness corresponding to the given value of the pixel data is equal to the ideal brightness, then the given value will be recorded in the step of S117. Otherwise, if the reference brightness corresponding to the given value of the pixel data is different from the ideal brightness, the present invention adjusts the given value to a final value until a final brightness corresponding to the final value is identical to the ideal brightness, as illustrated in the step of S119. Under such a circumstance, the final value of the pixel data will be recorded as one entry of the mapping table which is to be established in the step of S121. And therefore, after the step of S117 records the given value (when the brightness corresponding to the given value is identical to the ideal brightness) as well as the step of S121 records the final value (after adjusting the given value until the final brightness and the ideal brightness are identical), the step of S123 is performed so as to examine if all entries of the mapping table are recorded and collected. In an embodiment, when all entries of the mapping table are recorded and collected, then the mapping table is successfully formed and established in the step of S125. Otherwise, the above mentioned steps of S113, S115, S117, S119, S121 and S123 are performed repeatedly for collecting all the entries of the mapping table such that the mapping table can be prosperously formed and established in the step of S125.

The proposed method as illustrated in the flow chart in FIG. 10 is applicable to establish a predetermined table for the driving circuit to refer to, for driving a data line of the liquid crystal panel. The first mapping table MT1 in FIG. 5, the second mapping table MT2 in FIG. 6, the third mapping table MT3 in FIG. 7 and the fourth mapping table MT4 in FIG. 8 can be established by adopting the proposed method as disclosed in FIG. 10 of the present invention. And yet, once informed by people skilled in the related arts, various alternative and modification mapping table may also be established and will be apparent to those skilled in the art without departing from the spirits of the invention. And the present invention claims the same with equality.

Figure 11:
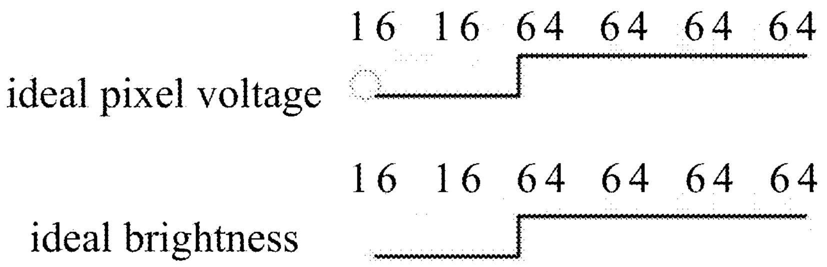
FIG. 11 schematically shows a diagram illustrating an ideal pixel voltage waveform for driving the plurality of sub-pixel units configured on a common data line of the liquid crystal display panel in order to show an ideal brightness.
Figure 12:
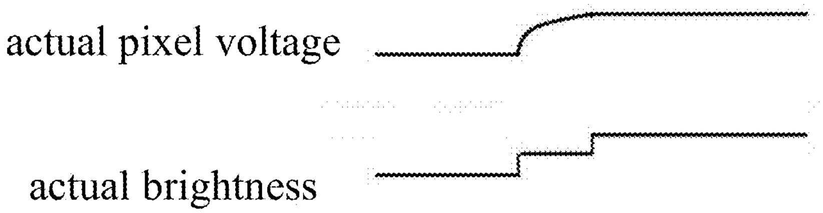
FIG. 12 schematically shows a diagram illustrating an actual pixel voltage waveform for driving the plurality of sub-pixel units configured on the common data line of the liquid crystal display panel and showing an actual brightness information in the prior arts.
Figure 13:
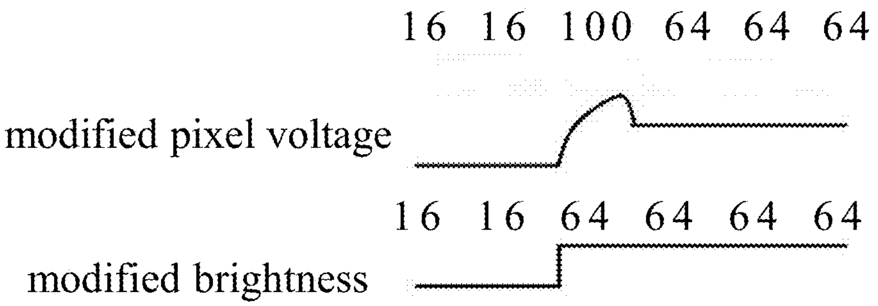
FIG. 13 schematically shows a diagram illustrating a modified pixel voltage waveform for driving the plurality of sub-pixel units configured on the common data line of the liquid crystal display panel and showing a final modified brightness information by employing the present invention.

Please proceed to refer to FIG. 11, FIG. 12 and FIG. 13, which the Applicants of the present invention provide so as to verify that the technical solution provided by the present invention is effective. FIG. 11 schematically shows a diagram illustrating an ideal pixel voltage waveform for driving the plurality of sub-pixel units configured on a common data line of the liquid crystal display panel in order to show an ideal brightness. On the other hand, FIG. 12 schematically shows a diagram illustrating an actual pixel voltage waveform for driving the plurality of sub-pixel units configured on the common data line of the liquid crystal display panel and showing an actual brightness information. As can be seen in FIG. 12, the actual brightness falls below expectations and is unfavorable. However, compared to the prior arts, FIG. 13 schematically shows a diagram illustrating a modified pixel voltage waveform for driving the plurality of sub-pixel units configured on the common data line of the liquid crystal display panel and showing a final modified brightness information by employing the present invention. As can be seen in FIG. 13, in view of adopting the technical solution of the present invention, as the pixel voltage is modified to be over-driven to have a correspondingly pixel data value of "100", a final modified brightness in FIG. 13, is achieved in significantly identical to the ideal brightness as illustrated in FIG. 11.

Figure 14:
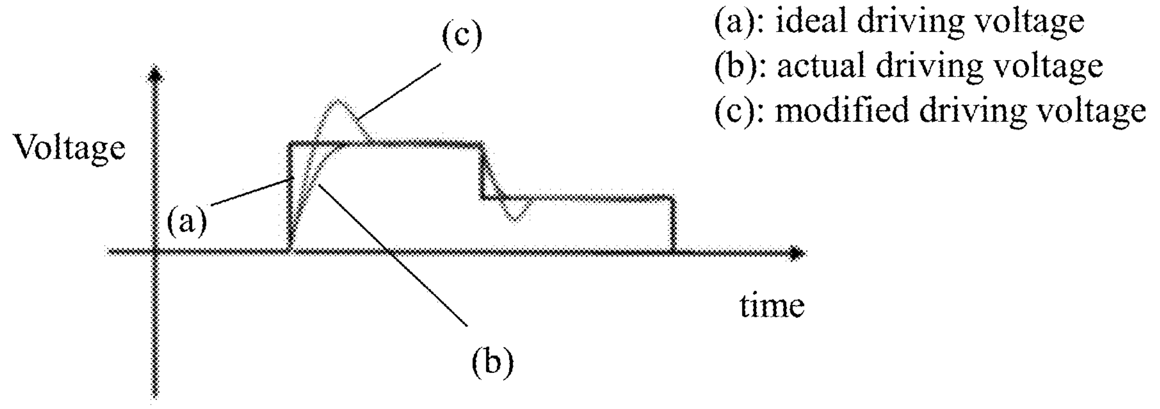
FIG. 14 shows a plurality of demonstrative waveforms of the driving voltage adapted for driving the data line of a liquid crystal display panel including an ideal driving voltage, an actual driving voltage and a modified driving voltage by employing the present invention under a scenario when no polarity transition is generated between each two adjacent sub-pixel units on a same data line.
Figure 15:
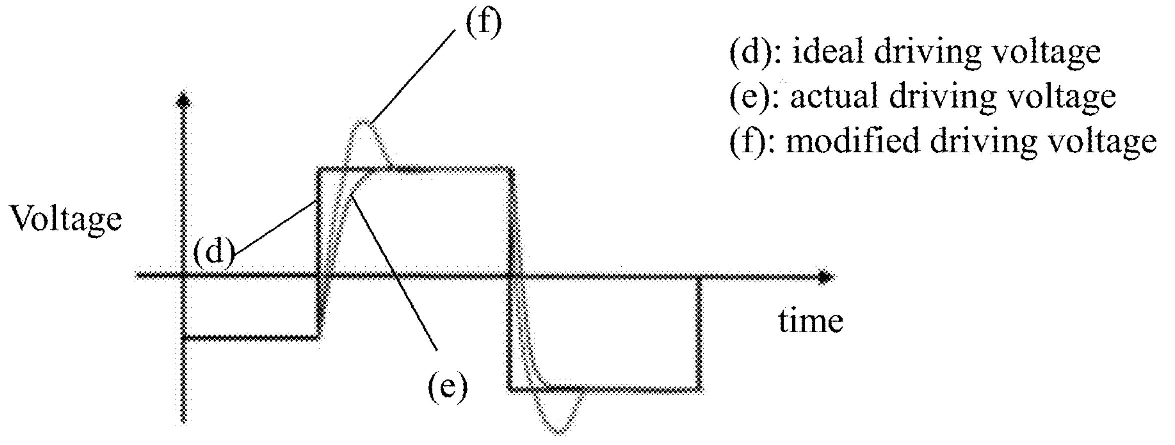
FIG. 15 shows a plurality of demonstrative waveforms of the driving voltage adapted for driving the data line of a liquid crystal display panel including an ideal driving voltage, an actual driving voltage and a modified driving voltage by employing the present invention under another scenario when there is polarity transition generated between each two adjacent sub-pixel units on a same data line.

And moreover, FIG. 14 shows a plurality of demonstrative waveforms of the driving voltage adapted for driving the data line of a liquid crystal display panel including (a) an ideal driving voltage, (b) an actual driving voltage and (c) a modified driving voltage by employing the present invention. FIG. 14 shows a scenario when no polarity transition is generated between each two adjacent sub-pixel units on a same data line. In addition, FIG. 15 similarly shows a plurality of demonstrative waveforms of the driving voltage adapted for driving the data line of a liquid crystal display panel including (d) an ideal driving voltage, (e) an actual driving voltage and (f) a modified driving voltage by employing the present invention, under another scenario when there is polarity transition generated between each two adjacent sub-pixel units on a same data line, for instance, polarity transits from positive (+) to negative (−), or from negative (−) to positive (+). As referring to both figures, it is apparent that the actual driving voltages in FIG. 14 and in FIG. 15 do not show as expected. However, on the contrary, after adopting the line over-drive technical contents of the invention, the modified driving voltages by employing the present invention are over driven for achieving the inventive effects of the present invention. And the liquid crystal display panel is not affected by polarity conversion, providing an optimal visual performance while compared with the prior arts. As a result, it is believed that pixel-level optimization result for a liquid crystal display panel is successfully achieved.

According to the present invention, the foregoing disclosed driving circuit adapted for driving a data line of a display panel and driving method thereof are proposed to be applied to a display device, which is composed of a liquid crystal display panel, for example. And yet the invention is not limited to such configurations. Alternative preferable components are compatible.

Therefore, based on at least one embodiment provided above, it is believed that the proposed driving circuit and driving method thereof which are adapted for driving a data line of a display panel of the present invention is characterized by providing at least one predetermined mapping table for the driving circuit to look up to and refer to. As such, the modified driving voltage is over-driven, in consideration with polarity transition applications. In addition, the present invention also proposes a method for establishing the at least one predetermined table for the driving circuit adapted for driving a data line of a display panel. By employing the proposed technical contents, the present invention is believed as beneficial to providing an optimum visual effect for a liquid crystal display panel device, suppressing and avoiding the conventional color shift issues and vertical stripe lines generated in the related technical backgrounds. As a result, when compared to the prior arts, it is obvious that the present invention apparently shows much more effective performances than before. In addition, it is believed that the present invention is instinct, effective and highly competitive for the display panel technologies and industries in the market nowadays, whereby having extraordinary availability and competitiveness for future industrial developments and being in condition for early allowance.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A driving circuit adapted for driving a data line of a display panel, comprising:

a controller circuit, being configured to provide at least one predetermined table and generate at least one pixel data according to the at least one predetermined table, wherein the at least one predetermined table is selected and applied according to a polarity state of a pixel data in related to a polarity state of a previous pixel data which is provided prior to the pixel data; and an outputting circuit, being electrically connected to the controller circuit and coupled to the data line for driving the data line of the display panel with at least one pixel voltage associated with the at least one pixel data;

wherein a first predetermined table from the at least one predetermined table is selected and applied to generate a first pixel data associated with a first pixel voltage to drive the data line of the display panel when a polarity state of the first pixel data and a polarity state of a previous pixel data which is provided prior to the first pixel data are identical, and a second predetermined table from the at least one predetermined table is selected and applied to generate a second pixel data associated with a second pixel voltage to drive the data line of the display panel when a polarity state of the second pixel data and a polarity state of a previous pixel data which is provided prior to the second pixel data are different, wherein the first predetermined table includes a first mapping table, where the first mapping table is applied when the polarity state of the previous pixel data which is provided prior to the first pixel data is positive, and the polarity state of the first pixel data remains at a positive polarity, and wherein the first predetermined table includes a second mapping table, where the second mapping table is applied when the polarity state of the previous pixel data which is provided prior to the first pixel data is negative, and the polarity state of the first pixel data remains at a negative polarity.

2. The driving circuit adapted for driving the data line of the display panel according to claim 1, wherein the first mapping table includes a plurality of entries, and each of the plurality of entries of the first mapping table corresponds to an entry of the second mapping table, and wherein at least one of the plurality of entries of the first mapping table is different from the corresponding entry of the second mapping table.

3. The driving circuit adapted for driving the data line of the display panel according to claim 1, wherein the second predetermined table includes a third mapping table, where the third mapping table is applied when the polarity state of the previous pixel data which is provided prior to the second pixel data is positive, and the polarity state of the second pixel data is switched to have a negative polarity.

4. The driving circuit adapted for driving the data line of the display panel according to claim 3, wherein the second predetermined table includes a fourth mapping table, where the fourth mapping table is applied when the polarity state of the previous pixel data which is provided prior to the second pixel data is negative, and the polarity state of the second pixel data is switched to have a positive polarity.

5. The driving circuit adapted for driving the data line of the display panel according to claim 4, wherein the third mapping table includes a plurality of entries, and each of the plurality of entries of the third mapping table corresponds to an entry of the fourth mapping table, and wherein at least one of the plurality of entries of the third mapping table is different from the corresponding entry of the fourth mapping table.

6. The driving circuit adapted for driving the data line of the display panel according to claim 1, wherein the first pixel data is outputted immediately following the previous pixel data which is provided prior to the first pixel data to drive the data line.

7. The driving circuit adapted for driving the data line of the display panel according to claim 6, wherein the first pixel data and the previous pixel data provided prior to the first pixel data are respectively outputted to drive each of two adjacent sub-pixel units of the display panel, and the two adjacent sub-pixel units are configured using a common data line on the display panel.

8. The driving circuit adapted for driving the data line of the display panel according to claim 1, wherein the second pixel data is outputted immediately following the previous pixel data which is provided prior to the second pixel data to drive the data line.

9. The driving circuit adapted for driving the data line of the display panel according to claim 8, wherein the second pixel data and the previous pixel data which is provided prior to the second pixel data are respectively outputted to drive each of two adjacent sub-pixel units of the display panel, and the two adjacent sub-pixel units are configured using a common data line on the display panel.

10. A method for driving a data line of a display panel, comprising:

providing at least one predetermined table, by a controller circuit, wherein the at least one predetermined table is selected and applied according to a polarity state of a pixel data in related to a polarity state of a previous pixel data which is provided prior to the pixel data;

examining the polarity state of the pixel data and the polarity state of the previous pixel data which is provided prior to the pixel data to select a first predetermined table or a second predetermined table from the at least one predetermined table;

applying the first predetermined table to generate a first pixel data associated with a first pixel voltage to drive the data line of the display panel, or applying the second predetermined table to generate a second pixel data associated with a second pixel voltage to drive the data line of the display panel, wherein the first predetermined table is applied when a polarity state of the first pixel data and a polarity state of a previous pixel data which is provided prior to the first pixel data are identical, and the second predetermined table is applied when a polarity state of the second pixel data and a polarity state of a previous pixel data which is provided prior to the second pixel data are different; and receiving the first pixel voltage or the second pixel voltage by a driving circuit when either the first predetermined table or the second predetermined table is selected and being applied, so as to drive the data line of the display panel with the first pixel voltage or the second pixel voltage, wherein the first predetermined table includes a first mapping table, where the first mapping table is applied when the polarity state of the previous pixel data which is provided prior to the first pixel data is positive, and the polarity state of the first pixel data remains at a positive polarity, and wherein the first predetermined table includes a second mapping table, where the second mapping table is applied when the polarity state of the previous pixel data which is provided prior to the first pixel data is negative, and the polarity state of the first pixel data remains at a negative polarity.

11. The method for driving the data line of the display panel according to claim 10, wherein the first mapping table includes a plurality of entries, and each of the plurality of entries of the first mapping table corresponds to an entry of the second mapping table, and wherein at least one of the plurality of entries of the first mapping table is different from the corresponding entry of the second mapping table.

12. The method for driving the data line of the display panel according to claim 10, wherein the second predetermined table includes a third mapping table, where the third mapping table is applied when the polarity state of the previous pixel data which is provided prior to the second pixel data is positive, and the polarity state of the second pixel data is switched to have a negative polarity.

13. The method for driving the data line of the display panel according to claim 12, wherein the second predetermined table includes a fourth mapping table, where the fourth mapping table is applied when the polarity state of the previous pixel data which is provided prior to the second pixel data is negative, and the polarity state of the second pixel data is switched to have a positive polarity.

14. The method for driving the data line of the display panel according to claim 13, wherein the third mapping table includes a plurality of entries, and each of the plurality of entries of the third mapping table corresponds to an entry of the fourth mapping table, and wherein at least one of the plurality of entries of the third mapping table is different from the corresponding entry of the fourth mapping table.

15. The method for driving the data line of the display panel according to claim 10, wherein the first pixel data is outputted immediately following the previous pixel data which is provided prior to the first pixel data to drive the data line.

16. The method for driving the data line of the display panel according to claim 15, wherein the first pixel data and the previous pixel data provided prior to the first pixel data are respectively outputted to drive each of two adjacent sub-pixel units of the display panel, and the two adjacent sub-pixel units are configured using a common data line on the display panel.

17. The method for driving the data line of the display panel according to claim 10, wherein the second pixel data is outputted immediately following the previous pixel data which is provided prior to the second pixel data to drive the data line.

18. The method for driving the data line of the display panel according to claim 17, wherein the second pixel data and the previous pixel data which is provided prior to the second pixel data are respectively outputted to drive each of two adjacent sub-pixel units of the display panel, and the two adjacent sub-pixel units are configured using a common data line on the display panel.

19. A method of establishing at least one predetermined table for a driving circuit adapted for driving a data line of a display panel, wherein the display panel includes a plurality of sub-pixel units, each of the plurality of sub-pixel units is driven by a pixel voltage associated with a pixel data to show brightness, the method comprising:

examining a polarity state of the pixel data and a polarity state of a previous pixel data which is provided prior to the pixel data to determine one of the at least one predetermined table for establishing;

providing a given value of the pixel data for showing a reference brightness and sensing the reference brightness by an optical sensor;

comparing the reference brightness to an ideal brightness which is expected to be shown, and adjusting the given value to a final value until a final brightness corresponding to the final value is identical to the ideal brightness;

recording the final value of the pixel data as one entry of the predetermined table for establishing; and collecting a plurality of the entries so as to form the predetermined table for establishing, wherein a first mapping table is established when the polarity state of the previous pixel data which is provided prior to the pixel data is positive, and the polarity state of the pixel data remains at a positive polarity, and wherein a second mapping table is established when the polarity state of the previous pixel data which is provided prior to the pixel data is negative, and the polarity state of the pixel data remains at a negative polarity.

20. The method of establishing the at least one predetermined table for the driving circuit adapted for driving the data line of the display panel according to claim 19, wherein each of the plurality of the entries of the first mapping table corresponds to an entry of the second mapping table, and wherein at least one of the plurality of the entries of the first mapping table is different from the corresponding entry of the second mapping table.

21. The method of establishing the at least one predetermined table for the driving circuit adapted for driving the data line of the display panel according to claim 19, wherein a third mapping table is established when the polarity state of the previous pixel data which is provided prior to the pixel data is positive, and the polarity state of the pixel data is switched to have a negative polarity.

22. The method of establishing the at least one predetermined table for the driving circuit adapted for driving the data line of the display panel according to claim 21, wherein a fourth mapping table is established when the polarity state of the previous pixel data which is provided prior to the pixel data is negative, and the polarity state of the pixel data is switched to have a positive polarity.

23. The method of establishing the at least one predetermined table for the driving circuit adapted for driving the data line of the display panel according to claim 22, wherein each of the plurality of the entries of the third mapping table corresponds to an entry of the fourth mapping table, and wherein at least one of the plurality of the entries of the third mapping table is different from the corresponding entry of the fourth mapping table.

24. The method of establishing the at least one predetermined table for the driving circuit adapted for driving the data line of the display panel according to claim 19, wherein the pixel data is outputted immediately following the previous pixel data which is provided prior to the pixel data to drive the data line.

25. The method of establishing the at least one predetermined table for the driving circuit adapted for driving the data line of the display panel according to claim 19, wherein the pixel data and the previous pixel data which is provided prior to the pixel data are respectively outputted to drive each of two adjacent sub-pixel units of the display panel, and the two adjacent sub-pixel units are configured using a common data line on the display panel.

26. The method of establishing the at least one predetermined table for the driving circuit adapted for driving the data line of the display panel according to claim 19, further comprising: recording the given value of the pixel data as one entry of the predetermined table for establishing when the reference brightness is identical to the ideal brightness.

27. The method of establishing the at least one predetermined table for the driving circuit adapted for driving the data line of the display panel according to claim 19, further comprising:

examining if all entries of the predetermined table for establishing are recorded and collected; and repeatedly providing the given value and adjusting the given value to the final value for collecting all entries so as to form the predetermined table.

* * * * *